Dec. 6, 1960 K. C. ALLEN 2,963,222
COMPUTING AND TICKET PRINTING SCALE
Filed Aug. 24, 1953
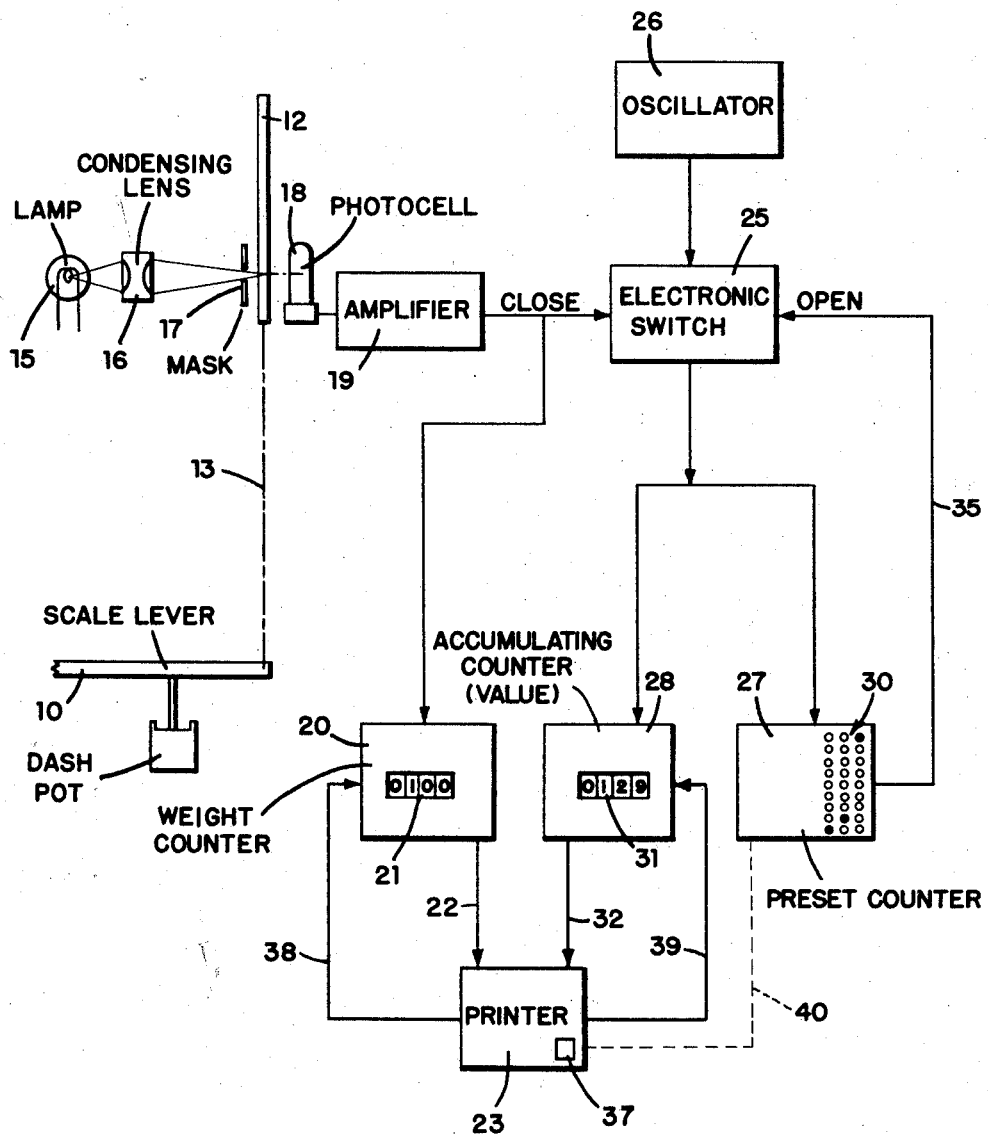
INVENTOR.
KENNETH C. ALLEN
BY
ATTORNEYS

United States Patent Office 2,963,222
Patented Dec. 6, 1960

2,963,222

COMPUTING AND TICKET PRINTING SCALE

Kenneth C. Allen, Dayton, Ohio, assignor to The Hobart Manufacturing Company, Troy, Ohio, a corporation of Ohio Filed Aug. 24, 1953, Ser. No. 376,137

8 Claims. (Cl. 235—151)

This invention relates to scales and more particularly to scales for computing total price and weight.

It is a principal object of the invention to provide a computing scale which has wide range in its capacity, which may be readily set with different unit prices, and which provides rapidly and accurately an indication of the computed price as well as weight of the article.

It is also an object to provide such a scale which is capable of furnishing a printed record of the entire transaction including the weight of the article, the unit price, and the total value.

Other objects and advantages will be apparent from the following description, the accompanying drawings, and the appended claims.

In the drawing:

The single figure is a diagrammatic view showing an embodiment of the new computing scale device.

Referring to the drawing, a scale lever is shown at 10 representing the weighing mechanism. Any desired weighing mechanism may be employed, utilizing either springs or weights, the weighing mechanism forming no part of the present invention. A dash pot device 11 is preferably provided to a eliminate over-travel of the scale lever and to assure that it will slow down and stop when it reaches the balance position without over-shooting.

A chart or grid 12 is connected to the lever by suitable connecting means 13 and arranged to move in direct relation to the travel of the lever. The chart may be light in weight and as shown may be arranged in the form of a flat plate since it is necessary that it carry only a single series of weight graduations. Such weight graduations may be formed optically, magnetically, or otherwise, in order to provide for producing a response in an electric circuit as each graduation passes a sensing point during the weighing operation.

As shown for illustrative purposes, an optical graduation is provided and a lamp 15 the beam of which is directed through condensing lens 16 toward a mask 17 adjacent the chart provides for projecting a light beam through the graduations of the chart and into receptive relation with photocell 18 on the opposite side thereof. Thus as the chart moves in response to the deflection of the lever during a weighing operation, a series of pulses will be developed in the photocell, one such pulse occurring as each graduation traverses the sensing point.

The sensing means 18 is connected through amplifier 19 to a weight counter 20 of any suitable type capable of responding to the number of separate pulses which are received therein, an electronic counter of the type where the result is produced on a series of rotatable register wheels such as shown in Patent No. 2,354,768 being suitable for this purpose. The counter may have a visual reading portion 21 on which the count of the total number of pulses appears on the register wheels, thereby furnishing a visible reading of the weight of the article. Likewise the counter is shown as furnishing an input 22 to printer 23 for correspondingly actuating the printer to set into it a count representing the weight of the article.

Printer 23 is of a suitable type for producing a printed record from a plurality of rotary shaft inputs such as the register wheels indicated at 21, a typical device for this purpose being as shown in Benson et al. Patent 2,728,521.

Sensing means 18 is likewise connected to an electronic switch or gate 25 arranged in such manner that the switch is closed (or the gate opened) in response to the transmission of each amplified pulse thereto. The switch controls a circuit from an oscillator 26 to two counters 27 and 28. Counter 27 is designated a preset counter and has a bank of keys 30 upon which may be set a count representative of the unit price of the article being weighed. A typical counter for this purpose is that described in the article entitled "A Preset Counter for Time and Quantity Measurements" in Tele-Tech for August 1953, page 82. Counter 28 is designated as an accumulating counter of the same type as counter 20 and has a visual reading portion 31 which affords a direct reading of the total count accumulated therein over the course of a weighing operation. The accumulating counter is likewise connected with another input 32 of printer 23 providing for setting into it a count corresponding to total value.

The oscillator 26 operates at a sufficiently high frequency as to produce a large number of oscillations during the passage of each weight graduation relative to the sensing means. Each counter 27 and 28 receives the oscillations during the time that electronic switch 25 is closed, and develops a count of the number of such oscillations which take place while the switch remains closed. When the number of counts thus occurring reaches the predetermined number which has been set into counter 27, that counter is operated and functions through control circuit 35 to open the circuit to electronic switch 25. Thereafter any remaining oscillations which occur prior to the passage of the next weight graduation are ineffective. However, upon the sensing of the next weight graduation, the electronic switch 25 is again closed, and the cycle is repeated. Meanwhile the count in accumulating counter 28 builds up a new increment equal in number to the unit price being added for each weight graduation, until a total is reached corresponding to the number of times the unit count has been repeated. Analysis will show that this total is therefore representative of the total value or price of the article at the price per pound previously selected. The printer may be tripped manually or automatically by actuating control 37 and then completes the printing of a ticket and operates through suitable reset circuits 38 and 39 to restore the weight counter 20 and the accumulating count 28 to their zero positions respectively in preparation for another weighing operation.

As an example, with weight graduations on chart 12 corresponding to each 0.01 of a pound, there are 100 pulses produced in photocell 18 during each pound deflection of the chart. Assuming that the scale is capable of weighing to twenty pounds in two seconds, it will produce pulses at the rate of approximately 1000 per second. The oscillator 26 should be capable of producing oscillations between successive pulses of a number at least as great as the largest unit price per pound. Thus the oscillator frequency could be selected as 300 kilocycles, which would provide for unit prices of up to $3.00 per pound. If the particular price per pound were selected at $1.29, such number would be set on the keyboard 30 of preset counter 27 and the article would then be placed on the platter. As each pulse closed electronic switch 25, the switch would remain closed until 129 pulses from the oscillator had been counted into both counters 27 and 28, at which time counter 27 would reset itself and open the switch which would remain open until the next pulse appeared. Each cycle of counts would be received and accumulated in the counter 28, so that at the end of the weighing operation that counter will have stored therein a count equal to the product of weight and price, or total value in 0.01 cent. Using the nearest whole cent value, the indicator 31 together with the printer are then set for proper actuation with the result that the value is clearly shown and printed in dollars and cents.

The printer may similarly have set into it through interconnection 40 actuated from keyboard 30 the same price per pound as that set into counter 27 so that when the ticket is printed it will properly show weight, unit price, and total value.

The invention thus provides an arrangement for a computing scale which has broad flexibility, is rapid and accurate, and which provides for printing a ticket or forming an indication of the entire transaction involved.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A computing scale having weighing mechanism and comprising a chart having a series of unit weight graduations thereon and movable in proportion to the weight on the scale, means for sensing the passage of each said graduation past a sensing point in response to movement of said chart during a weighing operation, a weight counter cooperating with said sensing means for counting the number of weight graduations passing said sensing point, an oscillator capable of producing a large number of oscillations during the passage of each said weight graduation, a preset counter adapted to be set with a predetermined number count corresponding to the unit price of the article, an accumulating counter, switch means, means for closing said switch means in response to the passage of each said weight graduation past said sensing point to complete a circuit from said oscillator to said accumulating counter providing for counting into said accumulating counter the number of said oscillations, and means controlled by said preset counter for opening said switch means during the passage of each said graduation when the count of said oscillations reaches said predetermined number.

2. A computing scale having weighing mechanism and comprising a chart having a series of unit weight graduations thereon and movable in proportion to the weight on the scale, means for sensing the passage of each said graduation past a sensing point in response to movement of said chart during a weighing operation, a weight counter cooperating with said sensing means for counting the number of weight graduations passing said sensing point, an oscillator capable of producing a large number of oscillations during the passage of each said weight graduation, a preset counter adapted to be set with a predetermined number count corresponding to the unit price of the article, an accumulating counter, switch means, means for closing said switch means in response to said passage of each said weight graduation to complete a circuit from said oscillator to said accumulating counter providing for counting into said accumulating counter the number of said oscillations, means controlled by said preset counter for opening said switch means during said passage of each said graduation when the count of said oscillations reaches said predetermined number, printing means, and means controlled respectively by said weight counter and said accumulating counter for transferring information to said printing means for printing the weight and total price of the article respectively.

3. A computing scale having weighing mechanism and comprising a chart having a series of unit weight graduations thereon and movable in proportion to the weight on the scale, means cooperating with said chart for producing a pulse in response to the passage of each said graduation past a sensing point during a weighing operation, an oscillator capable of producing a large number of oscillations during said passage of each said weight graduation, an accumulating counter, means operable in response to each said pulse for introducing a continuing series of oscillations from said oscillator into said accumulating counter a preset counter responsive to the number of said oscillations and operable when a predetermined number thereof have been counted corresponding to the unit price, and means controlled by said preset counter for discontinuing the supply of said oscillations to said accumulating counter during the passage of each of said graduations past said sensing point when said predetermined number has been reached, said accumulating counter providing a total count representative of the total price of the article.

4. A computing scale having weighing mechanism and comprising a chart having a series of unit weight graduations thereon and movable in proportion to the weight on the scale, means cooperating with said chart for producing a pulse in response to the passage of each said graduation past said means during a weighing operation, an oscillator capable of producing a large number of oscillations during said passage of each said weight graduation, a preset counter adapted to receive said oscillations and responsive to a predetermined number of said oscillations corresponding to the unit price of the article, an accumulating counter adapted to receive oscillations from said oscillator, means controlled by said passage of each of said pulses for initiating the counting into said accumulating counter and means controlled by said preset counter upon reaching of said oscillations, the predetermined number of counts for each said graduation for terminating further count accumulation for that graduation to provide a total count in said accumulating counter corresponding to the total price of the article.

5. A computing scale having weighing mechanism and comprising a chart having a series of unit weight graduations thereon and movable in proportion to the weight on the scale, means cooperating with said chart for producing a pulse in response to the passage of each said graduation past said means during a weighing operation, an oscillator capable of producing a large number of oscillations during said passage of each said weight graduation, switch means, a preset counter adapted to receive said oscillations and operable in response to the count thereof reaching a predetermined value corresponding to the unit price of the article, an accumulating counter likewise adapted to receive said oscillations and adapted to accumulate a total count thereof, means controlled by each said pulse for closing said switch means upon said passage of each said graduation, means controlled by the operation of said preset counter for opening said switch means between the passage of successive said graduations when the count therein reaches said predetermined value, said accumulating counter providing a total count corresponding to the price of the article.

6. A computing scale having weighing mechanism and comprising a chart having a series of unit weight graduations thereon and movable in proportion to the weight on the scale, means cooperating with said chart for producing a pulse in response to the passage of each said graduation past a sensing point during a weighing operation, an oscillator capable of producing a large number of oscillations during the passage of each said weight graduation, a weight counter for counting the number of said pulses providing a count corresponding to weight, a preset counter adapted to receive said oscillations and operable when said number reaches a predetermined value corresponding to the unit price of the article, an accumulating counter adapted to receive said oscillations, switch means for controlling the connection of said preset and accumulating counters with said oscillator, means for closing said switch means in response to the passage of each said pulse past said sensing point to provide for the counting operation of both said preset and accumulating counters, and means controlled by the operation of said preset counter for opening said switch means between successive pulses when the count therein reaches said preset value, said accumulating counter providing a total count of the price of the article.

7. A computing mechanism for obtaining the product of two factors as a digital output comprising a sensing device, a member carrying a series of graduations thereon movable relative to said sensing device through a predetermined displacement corresponding to the value of one of said factors, means controlled by said sensing device for producing a pulse on the passage of each said graduation past said sensing device, an oscillator, an accumulating counter adapted to receive and count said oscillations, a preset counter also adapted to receive and count said oscillations and to produce a control signal in response to the counting of a predetermined number of oscillations corresponding to the other said factor, means operable upon the occurrence of each said pulse to initiate the supply of oscillations into both said counters, and means operable by said control signal to terminate the supply of oscillations to said counters when the number counted reaches said predetermined number to thereby accumulate in said accumulating counter a total count corresponding to the product of said two factors.

8. A computing mechanism for obtaining the product of two factors as a digital output comprising a sensing device, a member carrying a series of graduations thereon movable relative to said sensing device through a predetermined displacement corresponding to the value of one of said factors, means controlled by said sensing device for producing a pulse on the passage of each said graduation past said sensing device, an oscillator, an accumulating counter adapted to receive and count said oscillations, a preset counter also adapted to receive and count said oscillations and to produce a control signal in response to the counting of a predetermined number of oscillations corresponding to the other said factor, means operable upon the occurrence of each said pulse to initiate the supply of oscillations into both said counters, means operable by said control signal to terminate the supply of oscillations to said counters when the number counted reaches said predetermined number to thereby accumulate in said accumulating counter a total count corresponding to the product of said two factors, and a separate counter for producing a separate count of the number of said pulses providing an indication of said one factor.

References Cited in the file of this patent

UNITED STATES PATENTS

| | | |
|---|---|---|
| 2,007,317 | Von Bohuszewicz | July 9, 1935 |
| 2,088,297 | Koenig | July 27, 1937 |
| 2,523,516 | Potter | Sept. 26, 1950 |
| 2,584,897 | Marco | Feb. 5, 1952 |
| 2,624,848 | Hancock et al. | Jan. 6, 1953 |
| 2,641,407 | Dickinson | June 9, 1953 |
| 2,680,241 | Gridley | June 1, 1954 |
| 2,686,632 | Wilkinson | Aug. 17, 1954 |
| 2,720,810 | Senn | Oct. 18, 1955 |
| 2,803,448 | Bieble | Aug. 20, 1957 |
| 2,881,416 | Hosken | Apr. 7, 1959 |

FOREIGN PATENTS

| | | |
|---|---|---|
| 1,034,751 | France | July 31, 1953 |

OTHER REFERENCES

"Toledo Dynamic Weigher," Instruments, April 1933, vol. 6, pp. 86, 87.

UNITED STATES PATENT OFFICE

CERTIFICATION OF CORRECTION

Patent No. 2,963,222                                     December 6, 1960

Kenneth C. Allen

It is hereby certified that error appears in the above numbered patent requiring correction and that the said Letters Patent should read as corrected below.

Column 1, line 37, strike out "a"; column 4, line 35, strike out "of said oscillations," and insert the same after "counter" in line 33, same column 4.

Signed and sealed this 9th day of May 1961.

(SEAL)
Attest:

ERNEST W. SWIDER
Attesting Officer

DAVID L. LADD
Commissioner of Patents